US008494689B1

(12) United States Patent
Ashton

(10) Patent No.: US 8,494,689 B1
(45) Date of Patent: Jul. 23, 2013

(54) AUTONOMOUS COORDINATION OF AGENTS

(75) Inventor: Geoffrey D. Ashton, Milford, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/467,241

(22) Filed: May 9, 2012

(51) Int. Cl.
*G06F 17/00* (2006.01)
(52) U.S. Cl.
USPC .............. 701/3; 701/301; 701/457; 709/201; 709/203; 709/206; 709/223; 706/25; 706/45; 706/46; 706/50; 706/54; 318/135; 318/153; 318/687; 719/315; 719/317
(58) Field of Classification Search
USPC .............. 701/3, 315, 301, 457; 709/201, 202, 709/206, 223; 706/10, 13, 25, 45, 46, 50, 706/54, 59, 61; 719/206, 315, 317; 707/999.01, 707/999.104; 379/93.24, 100.08; 345/473, 345/474, 952; 271/194, 195; 718/102; 1/1; 318/135, 153, 687
See application file for complete search history.

(56) References Cited

U.S. PATENT DOCUMENTS

| | | | | |
|---|---|---|---|---|
| 5,058,833 A | * | 10/1991 | Carmouche | 244/158.1 |
| 5,764,239 A | * | 6/1998 | Misue et al. | 345/440 |
| 7,320,289 B1 | * | 1/2008 | Clarke et al. | 114/72 |
| 7,839,101 B2 | * | 11/2010 | Yu et al. | 318/135 |
| 8,234,067 B2 | * | 7/2012 | Bauer et al. | 701/467 |
| 2002/0138179 A1 | | 9/2002 | Payton et al. | |
| 2009/0099768 A1 | | 4/2009 | Bauer et al. | |

OTHER PUBLICATIONS

Ian F. Akyildiz, et al.,"Wireless Multimedia Sensor Networks: Applications and Testbeds," Proceedings of the IEEE, vol. 96, No. 10, pp. 1588-1605, Oct. 2008.
Tommaso Melodia, et al., "Handling Mobility in Wireless Sensor and Actor Networks," IEEE Transactons on Mobile Computing, vol. 9, Issue 2, pp. 1-14, Feb. 2010.

* cited by examiner

*Primary Examiner* — McDieunel Marc
(74) *Attorney, Agent, or Firm* — Cantor Colburn LLP

(57) ABSTRACT

A method of controlling movement of an agent operating within an autonomous system includes determining, using a processing device associated with the agent, a highest attraction point for the agent on a line of optimal transmission between a detected event within an area of surveillance by the autonomous system and a base station within the autonomous system, and calculating an attraction force for the agent, based on the line of optimal transmission and location of the detected event; determining proximity of the agent to one or more additional agents operating within the autonomous system, and calculating a repulsion force for the agent so as to maintain a minimum separating distance between the agent and the one or more additional agents; calculating a resultant force for the agent based on the attraction force and the repulsion force; and changing a direction of the agent based on the resultant force.

20 Claims, 9 Drawing Sheets

US 8,494,689 B1

AUTONOMOUS COORDINATION OF AGENTS

BACKGROUND

The present disclosure relates generally to swarm navigation techniques and, more particularly, to a method and system for autonomous coordination of agents.

An autonomous system is one that can perform tasks in a dynamic environment without continuous human supervision, and possesses the ability to alter its behavior based on its interactions with the surrounding environment. Autonomous systems capable of performing such advanced functions have been limited due to the difficulty in designing approaches that are practical to implement. With advances in technology and the emergence of Unmanned Aerial Vehicles (UAVs), such UAVs present an ideal platform for autonomous technology that could be applied in numerous applications, such as persistent surveillance and communications relay, for example.

UAV technology is currently a very active area of research, with platforms being studied ranging from fighter sized aircraft to insect sized platforms that can be used in a multitude of applications, such as border security, disaster response, and military applications. For these applications, a demand exists for low cost platforms that could be used for persistent surveillance and communications relay over large areas and for long periods of time.

SUMMARY

In an exemplary embodiment, a method of controlling movement of an agent operating within an autonomous system includes determining, using a processing device associated with the agent, a highest attraction point for the agent on a line of optimal transmission between a detected event within an area of surveillance by the autonomous system and a base station within the autonomous system, and calculating an attraction force for the agent, based on the line of optimal transmission and location of the detected event; determining proximity of the agent to one or more additional agents operating within the autonomous system, and calculating a repulsion force for the agent so as to maintain a minimum separating distance between the agent and the one or more additional agents; calculating a resultant force for the agent based on the attraction force and the repulsion force; and changing a direction of the agent based on the resultant force.

In another embodiment, a method of controlling movement of agents operating within an autonomous system includes determining for each agent, using a processing device associated with the agent, a highest attraction point for the agent on a line of optimal transmission between a detected event within an area of surveillance by the autonomous system and a base station within the autonomous system, and calculating an attraction force for the agent, based on the line of optimal transmission and location of the detected event; determining proximity of the agent to one or more additional agents operating within the autonomous system, and calculating a repulsion force for the agent so as to maintain a minimum separating distance between the agent and the one or more additional agents; calculating a resultant force for the agent based on the attraction force and the repulsion force; and changing a direction of the agent based on the resultant force; wherein, upon detection of the event, the agents are disposed along the line of optimal transmission so as to define a multi-hop communication path between the event and the base station.

In still another embodiment, a moveable agent configured to operate within an autonomous system includes a processing platform having at least one general-purpose programmable processor. The processor is configured to: determine a highest attraction point for the agent on a line of optimal transmission between a detected event within an area of surveillance by the autonomous system and a base station within the autonomous system, and calculate an attraction force for the agent, based on the line of optimal transmission and location of the detected event; determine proximity of the agent to one or more additional agents operating within the autonomous system, and calculating a repulsion force for the agent so as to maintain a minimum separating distance between the agent and the one or more additional agents; calculate a resultant force for the agent based on the attraction force and the repulsion force; and change a direction of the agent based on the resultant force.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
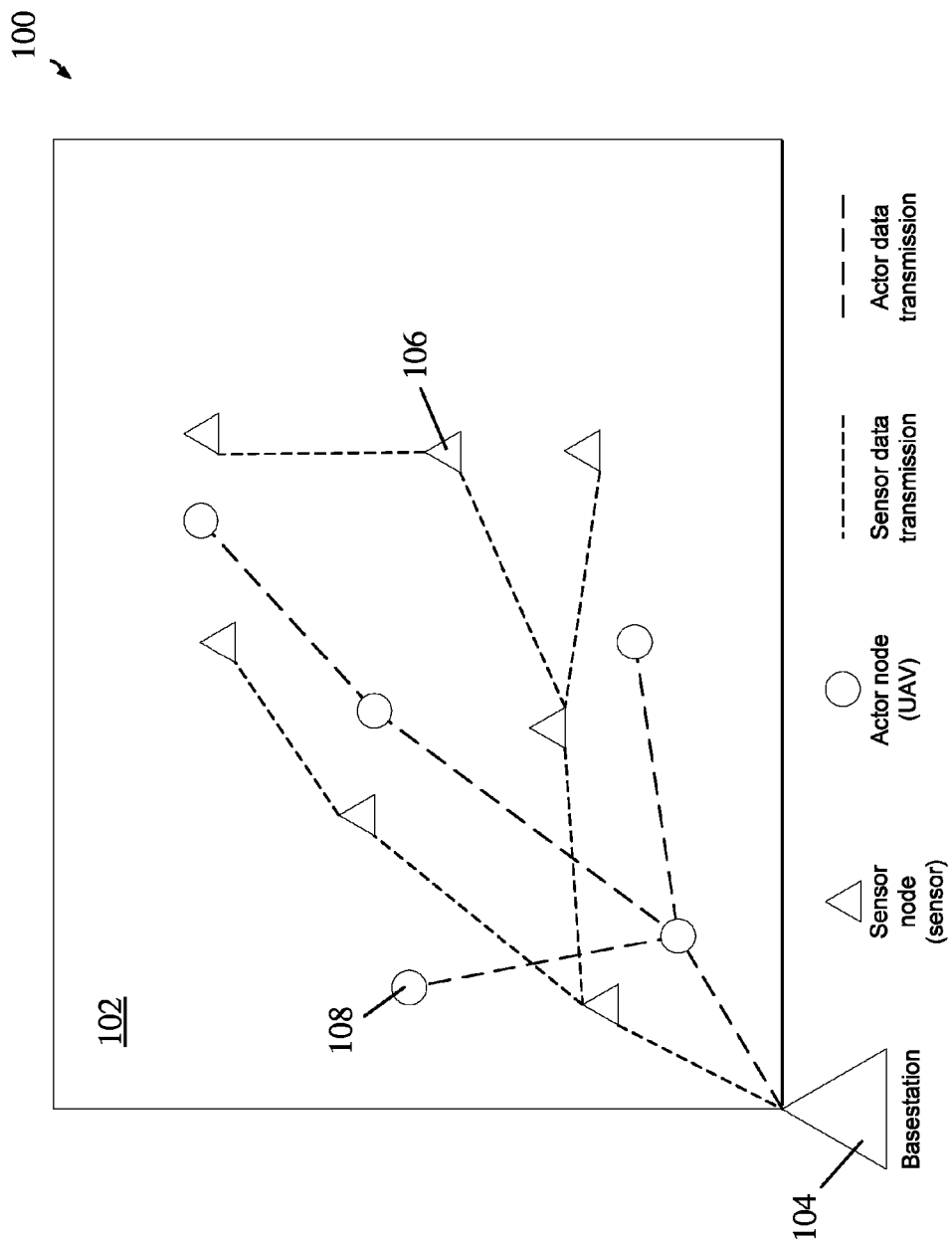
FIG. 1 is a schematic diagram illustrating a wireless sensor and actor network (WSAN) architecture utilizing unmanned aerial vehicles (UAVs) in accordance with an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature(s) being described. Also, the description is not to be considered as limiting the scope of the embodiments described herein.

One approach to the above described need for low cost platforms that could be used for persistent surveillance and communications relay over large areas and for long periods of time involves the use of many small, low cost, autonomous vehicles that use biologically inspired swarming algorithms for coordinated, cooperative control. However, these autonomous platforms need flexible algorithms capable of allowing the UAVs to adapt to various situations in their environment while providing the ability for the UAVs to coordinate for collaborative responses. Ideally, the system would have the ability to coordinate and react to different situations with different responses. As discussed in further detail below, the embodiments described herein provide exemplary methods and mechanisms for autonomous coordination of UAVs within a system, having the potential for providing solutions to many real world applications.

Wireless Sensor Networks (WSNs) are networks comprising resource-constrained wireless devices that can retrieve multimedia content such as video and audio streams, still images, and scalar sensor data from the environment. Along with the ability to retrieve such content, these devices may define a wireless ad-hoc network with other devices in range to create a multi-hop path for data to be passed to a central point, such as a base station, where analysis of the data takes place. A Wireless Sensor and Actor Network (WSAN) is essentially a WSN with the addition of "actor" nodes that are capable of performing additional functionality in the system beyond those of the sensor nodes. For example, actor nodes may, in addition to processing the sensor node data, also have the ability to perform some action on the environment (thus the term "actor"). In the present disclosure, one difference between sensor and actor nodes is the mobility of the actors. In this regard, UAVs may provide a particularly suitable platform for actor nodes in a WSAN application such as, for example, border security, disaster response, and various military applications.

More specifically, sensors in a WSAN are typically low-cost, and perform low-power sensing applications, which allow them to be expendable and densely distributed within the area that they are monitoring. In contrast, actors in a WSAN are more advanced than the sensor nodes, and are capable of collecting and processing sensor data and performing actions on the environment. Typically, actors are resource rich devices equipped with high processing capabilities, high transmission power, and long battery life. Upon receiving sensor data, the actors reprocess the data, and coordinate with each other in a distributed controlled manner to bring about a solution to the event detected.

One problem addressed by the present embodiments relates to the need for an autonomous method for coordination of agents. Autonomy is a customer desired trait for new systems, be it those with physical agents (e.g., robots) or non-physical agents (e.g., software). While autonomy may represent a major desire in new systems, it is another matter to design an autonomous system that is both practical and implementable. Existing approaches have utilized predefined maps or beacons to implement "attraction and repulsion" autonomous algorithm. However, the main drawback with such solutions is that the technique is largely predefined and based on other agents or waypoints in the system. In contrast, the approach taken in the present disclosure is reactive based on events detected by the system, and has less predefined components of the system with respect to previous approaches.

Accordingly, disclosed herein are an architecture, framework, method and system for autonomous coordination of agents. In the exemplary embodiments herein, the agents are described in the context of Unmanned Aerial Vehicles (UAVs). However, it will be understood that the principles are equally applicable to other types of mobile vehicles such as land, sea, air or space based. In any event, an autonomous system agent in accordance with the present embodiments performs tasks in a dynamic environment without continuous human supervision and alters its behavior based on the interactions it has with the environment.

Using an attraction and repulsion method in a system including both (1) ground based stationary sensors and (2) UAVs capable of surveillance and communication relay, the UAVs randomly distribute themselves about an area until an event detection requires action. Upon event detection, the UAVs coordinate and collaborate autonomously without human interaction and provide communication relay from the event detection site to a central base station where the sensor and UAV data is collected. The attraction and repulsion method works in such a way that the UAVs are attracted to the event site and a line of "optimal transmission" (i.e., a line connecting the event site to the base station). At the same time, the UAVs are repulsed from each other as they come into close proximity of one another. This allows the UAVs to spread out and align themselves along the line of optimal transmission for communication relay, thus requiring no human interaction or decision making.

In a further aspect, an attraction and repulsion method uses a set of rules and reactions to certain situations (e.g., repulsion when in close proximity, attraction to points of interest) to create a collaborative and coordinated response to a situation (i.e., lining up along the line of optimal transmission).

Referring initially to FIG. 1, there is shown a schematic diagram illustrating a wireless sensor and actor network (WSAN) architecture 100 utilizing unmanned aerial vehicles (UAVs) in accordance with an exemplary embodiment. As illustrated, the architecture 100 may be completely autonomous, requiring input from a user only in terms of an area 102 to patrol (user defined boundaries). Also included within the exemplary architecture 100 are a base station 104, stationary sensor nodes 106 and actor nodes 108.

In one exemplary embodiment of the WSAN architecture 100, the sensor nodes 106 may include low power, radio capable sensors that are randomly distributed throughout the area 102 under observation, and are capable of using each other as hops in a multi-hop path to pass data to the base station 104, where the data would be collected and analyzed. The actor nodes 108 may be embodied by mobile UAVs that have advanced computing and action capabilities with respect to the sensor nodes 106. The UAVs 108 may have the further capability of using one other as a multi-hop path in passing their own data to the base station 104, and in the course of covering or patrolling the area 102 would initially move about the area 102 in a random fashion until such time as an event is detected.

As indicated previously, the UAVs 108 are programmed to cover the entire area 102 of interest, without clustering or running into each other, using an attraction and repulsion method. Similar to the way in which two identically polarized ends of two different magnets repel each other when brought together, when two UAVs 108 come into a predetermined proximity of each other, evasive actions are be taken by each to redirect their current path of movement. In effect, the UAVs 108 may maintain the maximum possible distance from each other for which they were still in transmission range of each other. This would ensure that the UAVs 108 are adequately distributed over the area 102 of interest, yet still in transmission range of each other. This minimum distance of separation may be represented by the distance in the following equation for received power experiencing free space path loss:

$$P_R = P_T \left( \frac{c}{4\pi f d} \right)^2 \qquad \text{Eq. 1}$$

where $P_R$ is the power received by a UAV 108, $P_T$ is the power transmitted, d is the distance between the transmitting and receiving UAVs 108, c is the speed of light, and f is the frequency of the transmitted signal. Assuming that the transmitted power $P_T$ is held constant, and knowing that:

$$P_R = P_{R_{Th}} \pm \delta \qquad \text{Eq. 2}$$

where $P_{R_{Th}}$ is the received power threshold needed for communication between UAVs 108, and δ is an added factor of uncertainty, the separation distance d could be calculated easily and maintained. Algorithms used to control the UAVs 108 may, for example, place a certain "value of repulsion" for the situation when two UAVs came into proximity of distance d to each other. This repulsion factor will be explained further in conjunction with an "attraction factor" used to control UAV response to event detection.

The sensor nodes 106 in FIG. 1 may, for example, be responsible for monitoring the environment within the area 102 for a certain situation or event, and alerting the base station 104 upon event detection. The sensor nodes 106 may use other sensor nodes 106 as hops along a path to the base station 104, allowing sensors out of range of the base station 104 to alert the system of event detection. The sensor nodes 106 may be randomly distributed throughout the area 102 under surveillance with sufficient density so as to be capable of detecting all significant events. In an effort to conserve energy and bandwidth, the sensors may transmit their respective sensor readings on set intervals, making an exception only when a reading level is over a certain threshold, e.g., an event has been detected. In this architecture, the base station 104 is responsible for collecting the data received from the sensor nodes 106, and in one embodiment making decisions as to how the system will react (i.e., the UAV response to event detection). In other embodiments, it is contemplated that the UAVs 108 themselves may initiate their own response to an event detection.

When an event is detected, several sensor nodes 106 proximate the location of the event will return a value greater than the threshold value to the base station 104. To analyze the data received from the sensors nodes 106, and to generate a response, the base station uses, in one embodiment, clustering algorithms to group sensor nodes 106 within the proximity that returned the higher values so as to create an approximation for the exact location of the event. By performing these steps, the base station 104 can call the UAVs 108 into action to bring about a solution to the event. Additional figures described below depict how the base station 104 is capable of responding to event detection.

Figure 2:
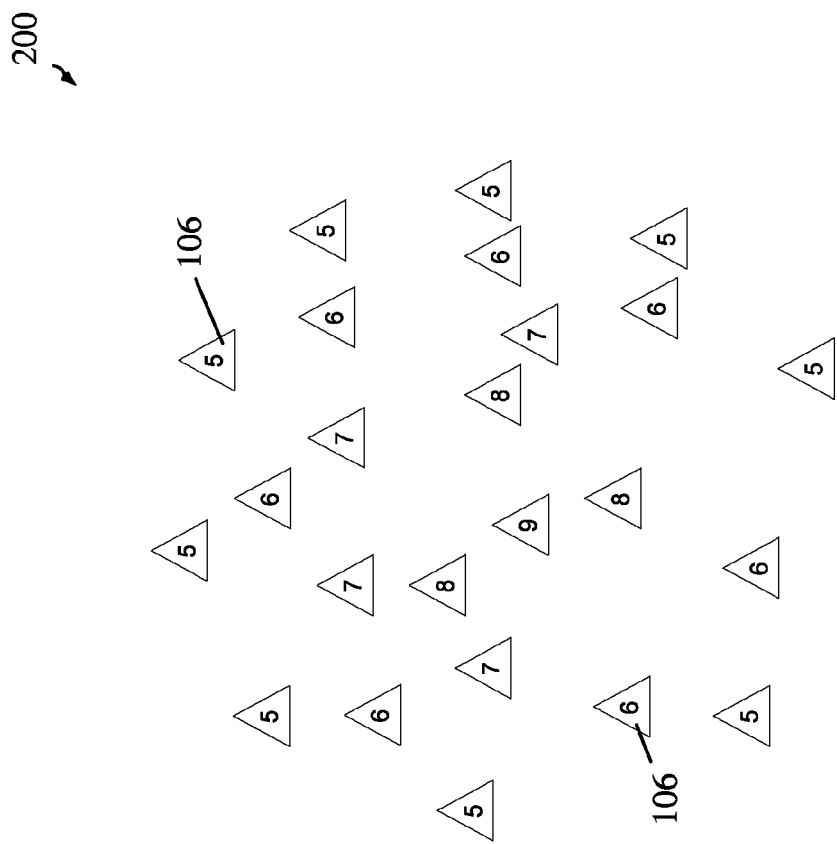
FIG. 2 is a schematic diagram of an event detection region that illustrates an exemplary collection of sample sensor values fed to the base station via the sensor nodes, in accordance with an exemplary embodiment.

FIG. 2 is a schematic diagram of an event detection region 200 that illustrates an exemplary collection of sample sensor values fed to the base station 104 via the sensor nodes 106. The base station 104 maps out the sensor values in accordance their position in the area in question as seen in the figure. In one embodiment, the sensor readings may correspond to a predetermined scale, for example discrete values ranging from 1-10, where 10 is the highest possible value with respect to the environment and the event being detected. For example, in a case where the sensors nodes are configured to detect heat, and where the defined event is a fire, then sensor readings correlate to sensor node distance from the fire. Here, only certain sensor reading values are considered notable based on the application of the system. In the example depicted in FIG. 2, a sensor reading of 5 and above is established to be relevant to event detection, and therefore only those sensors having a reading above this threshold value report their values to the base station 104. Once the base station 104 has mapped out the values of the sensors with readings above the determined threshold, clustering algorithms can then be used to generate a best estimate as to the location of the event.

Figure 3:
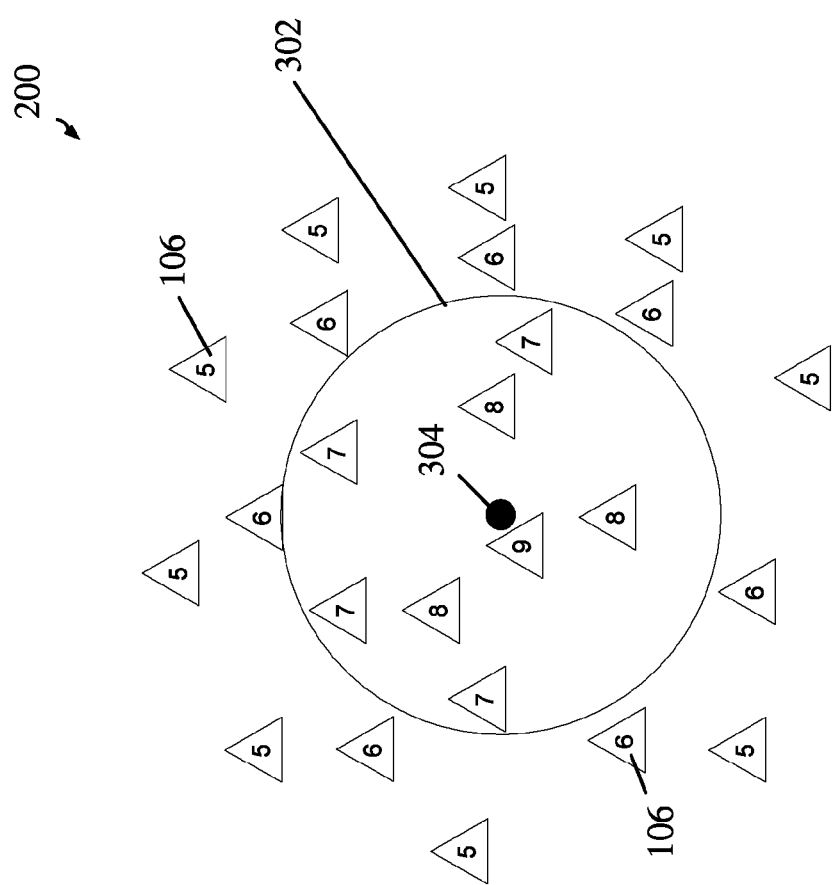
FIG. 3 is a schematic diagram illustrating a circle created by one or more clustering algorithms based on the sensor readings of the event detection region in FIG. 2, with the center point representing the system's approximation of event location.

For example, as shown in FIG. 3, one or more clustering algorithms have created a circle 302 based on the reading levels of the sensor nodes 106 and their locations in the area under observation. In this case, the algorithm(s) have clustered those sensors reporting reading levels of 7 and above. Once the circle 302 has been created based on these levels, the center of the circle 302 is deemed the best estimate as to the precise location 304 of the detected event within the event detection region 200.

Figure 4:
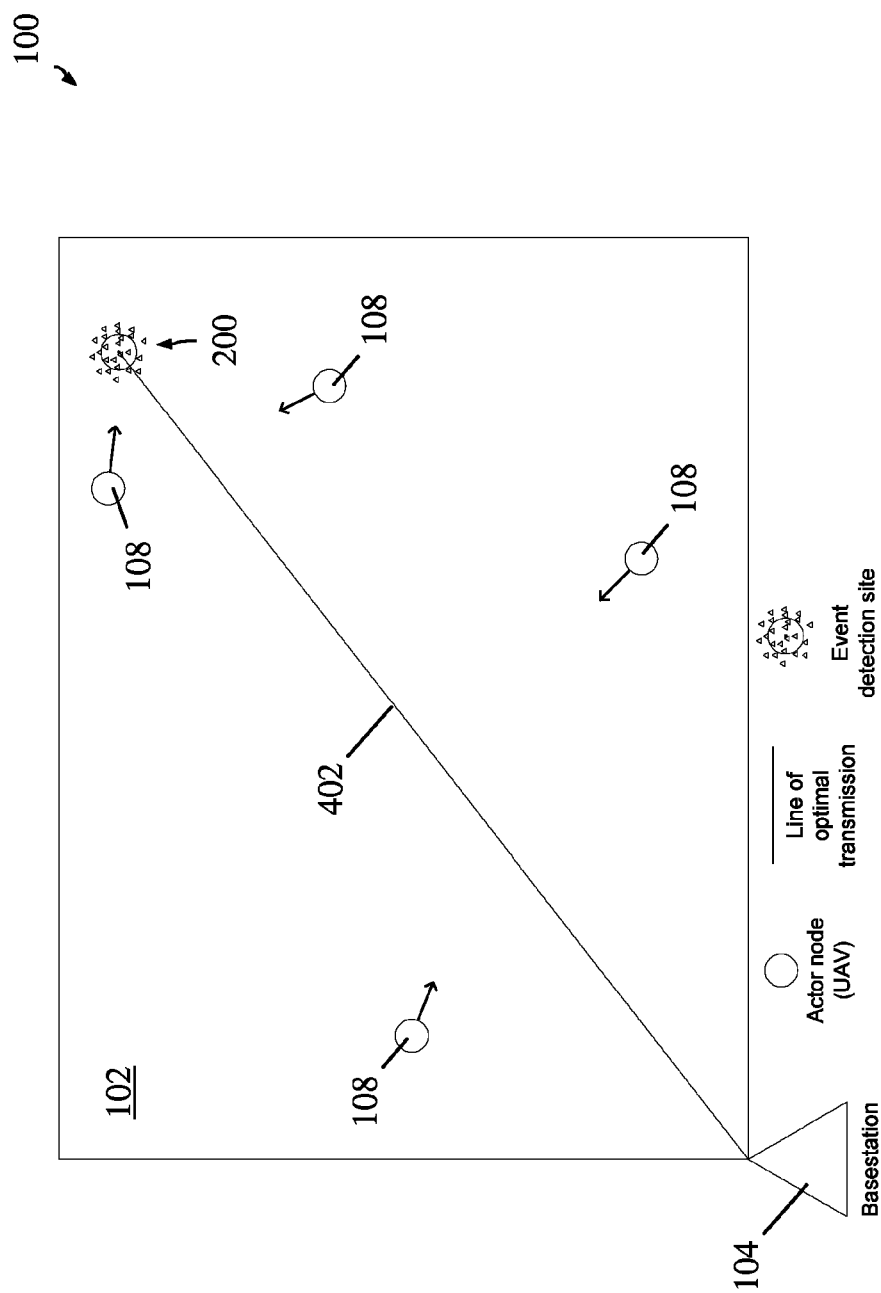
FIG. 4 is a schematic diagram of the WSAN architecture of FIG. 1, with the UAVs being drawn to a detected event or to an optimal line of transmission between the detected event and the base station.

Once the base station 104 has determined a best estimate as to the location of the detected event, the UAVs 108 are then called into action to bring about a solution. In one embodiment, the base station 104 transmits a high power, broad agency announcement alerting the UAVs 108 to the estimated location. The base station 104 additionally broadcasts a line of "optimal transmission," i.e., a line that directly connects the location 304 of the detected event to the base station 104. This line represents the best path for a communication relay from the precise event location 304 to the base station 104. Since an individual UAV 108 may be unable to transmit from the precise event location 304 to the base station 104, the UAVs 108 create a multi-hop path along the line of optimal transmission to pass data between the two points. As is the case with the programming of the UAVs 108 with a repellent factor to create separation therebetween, "attraction factors" are also applied to both the best estimate of precise event location and a determined number of discrete points on the line of optimal transmission to draw the UAVs 108 to their respective locations. An example of this scenario is depicted in FIG. 4.

Figure 5:
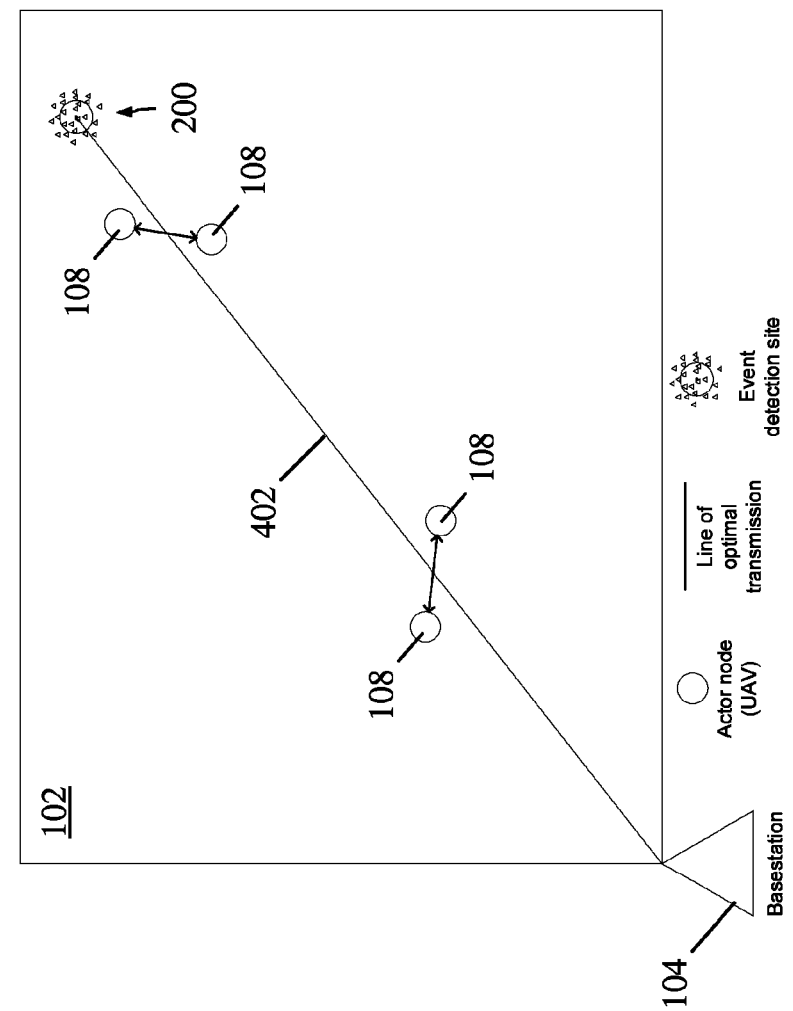
FIG. 5 is a schematic diagram of the WSAN architecture of FIG. 4, illustrating initial alignment of the UAVs drawn to the detected event or the optimal line of transmission.

As the UAVs 108 are randomly scattered about the area 102 under surveillance, some will initially be drawn to the event detection location 200 and others to (discrete points on) the line of optimal transmission 402, based on their respective positions at the time of the broadcast from the base station 104. As the individual UAVs 108 approach the optimal line of transmission 402, they will naturally spread out from one another due to the repellent factor inherit in their programming. An example of this scenario is depicted in FIG. 5.

Figure 6:
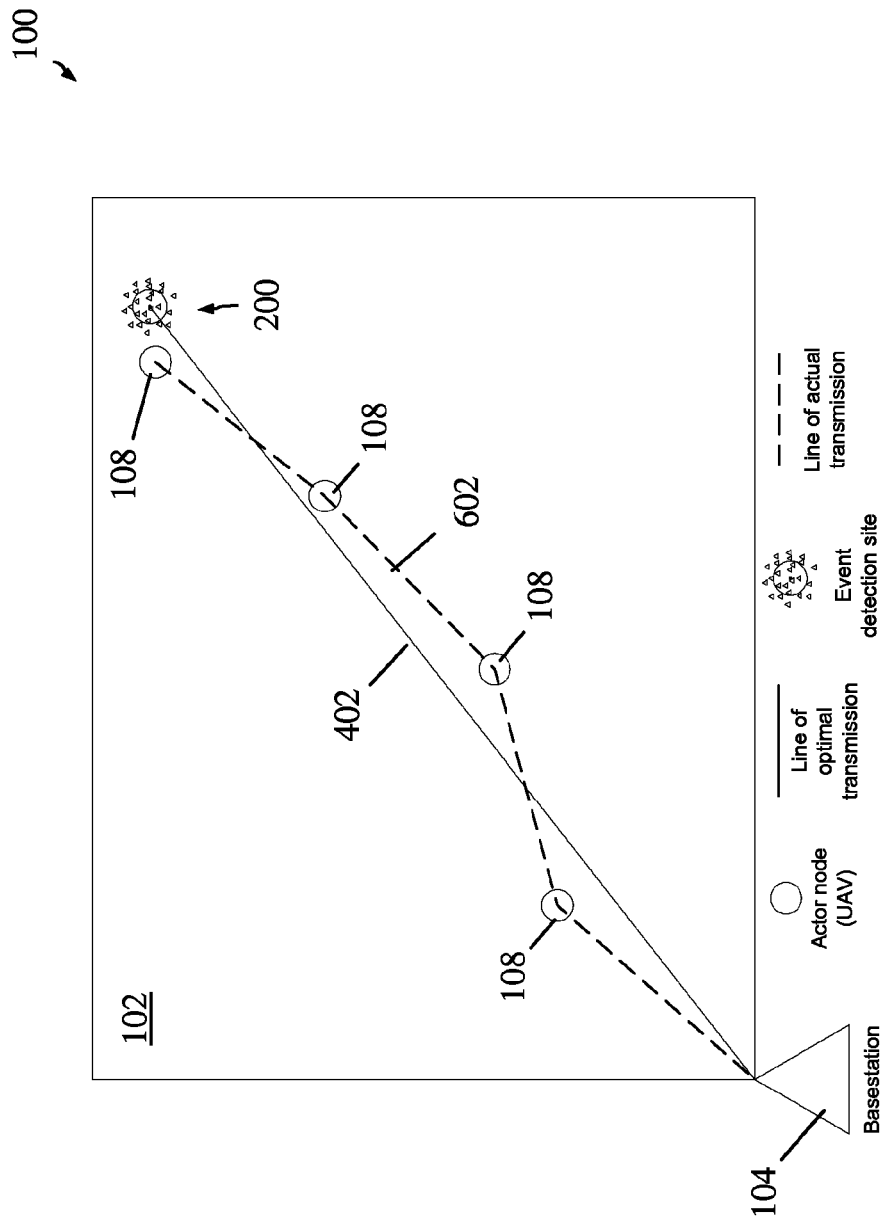
FIG. 6 is a schematic diagram of the WSAN architecture of FIG. 5, illustrating an exemplary final alignment of the UAVs.

Eventually, as the individual UAVs 108 approach the optimal line of transmission 402 from several different locations in the area 102 under surveillance, the line will 402 become populated with enough UAVs 108 to pass data from the location of event detection 200 to the base station 104. A more realistic configuration of a final alignment may have UAVs 108 on each side of the optimal line of transmission 402, as depicted in FIG. 6. As can be seen from FIG. 6, the dotted line 602 represents the actual line of transmission. The creation of an alignment as shown in FIG. 6 may be useful for many applications. For example, if the UAVs 108 were equipped with camera capabilities, a live feed of the event site could be fed in real time to the base station 104 for storage, analysis, or viewing by an operator.

Figure 7:
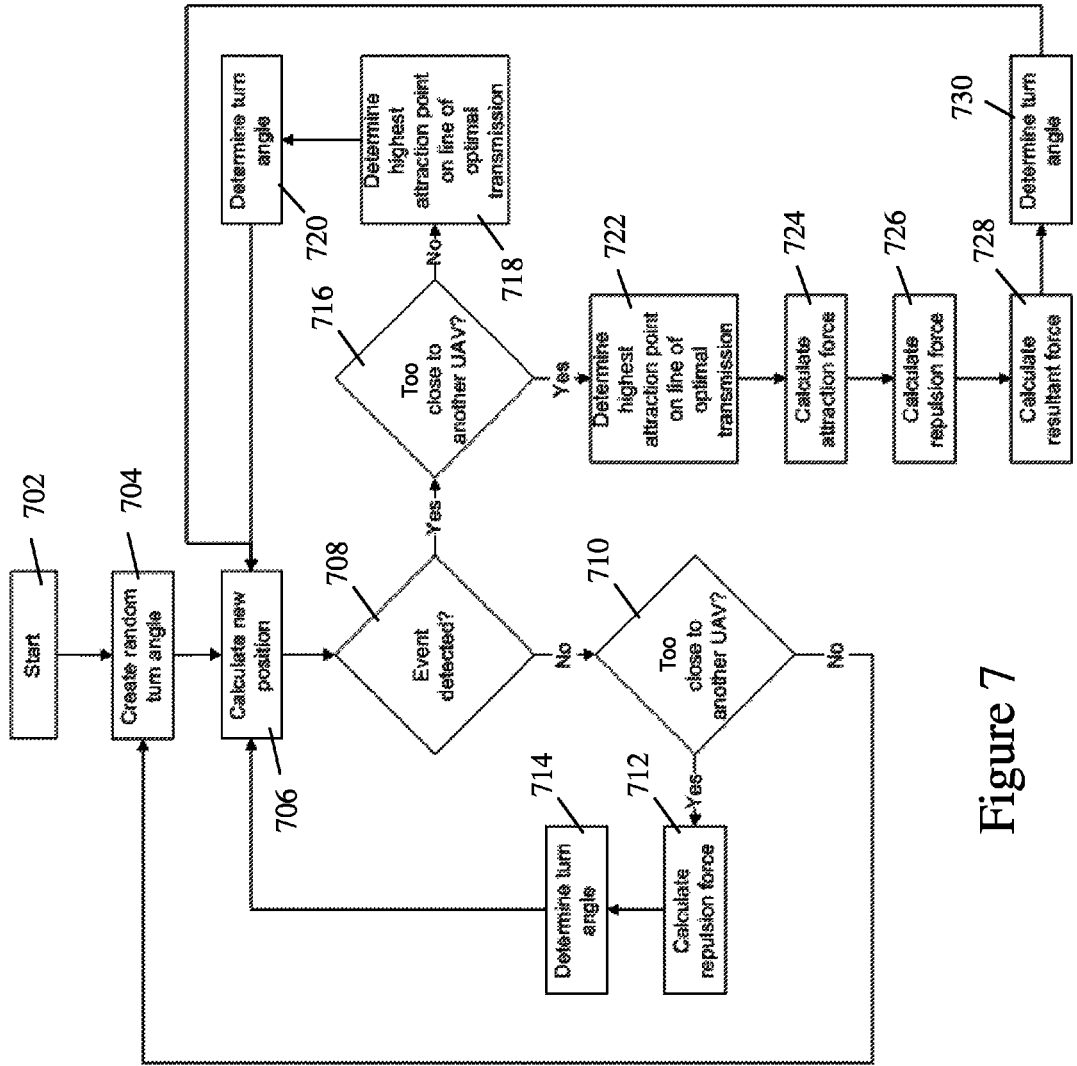
FIG. 7 is a flow diagram illustrating a method of positioning a UAV used in the WSAN architecture, in accordance with an exemplary embodiment.

Referring now to FIG. 7, there is shown a flow diagram 700 illustrating a method of positioning a UAV used in the WSAN architecture, in accordance with an exemplary embodiment. Each UAV within the architecture may have the capability of executing such an algorithm. Beginning from start block 702, the method proceeds to block 704 in which a random turn angle for the UAV is generated, consistent with an initial state where the UAVs are moving randomly about the area under surveillance. As the UAV moves in accordance with a random turn angle (e.g., within a predefined turn angle limit, and for a set amount of time), it then calculates its new position, as illustrated in block 706.

As reflected in decision block 708, the algorithm continually checks to see whether an event has been detected. Assuming in the first case that no such event is detected, the process proceeds to decision block 710 to determine whether the UAV is "too close" to any other UAV, i.e., whether the UAV is within a predefined distance of another UAV. If not, the UAV may continue on its course, and return to block 704 for creating another random turn angle. On the other hand, if it is determined at decision block 710 that the UAV is in fact too close to one or more other UAVs, then the algorithm proceeds to block 712 for calculation of a repulsion force. More specifically, the total repulsion forces on each UAV as a result of all the UAVs within the predefined distance are calculated, and a resultant repulsion force and angle are determined.

Figure 8:
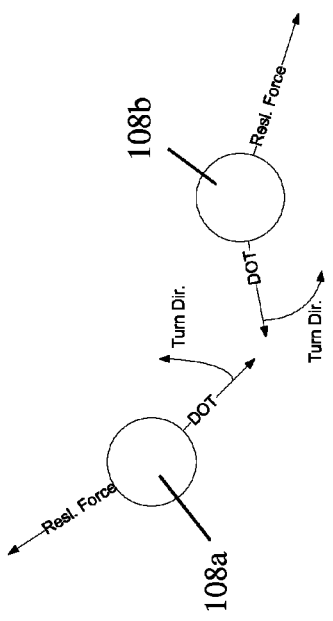
FIG. 8 schematically depicts repulsion of a pair of UAVs.

By way of example, if three UAVs are within the predefined proximity of each other, each UAV will have two UAVs applying repulsion forces on it, resulting in a total force and angle. Each UAV then determines which way to turn with respect to its current direction of travel, as indicated in block 714. FIG. 8 schematically depicts repulsion of a pair of UAVs 108a, 108b, illustrating the current direction of travel (DOT) of each UAV, and the resultant force and turn direction for each. The total repulsion forces, resultant force, and resultant angle and turn angle are calculated until the UAV(s) in question create enough distance between them as compared to the predefined "too close" distance. Referring once again to FIG. 7, the turn angle determined based on the repulsion action results in calculating a new position, as the process returns to block 706. Assuming there is still no event detected (decision block 708), once the UAV attains a sufficient distance of separation (decision block 710), the UAV may resume moving with random turn angles as in block 704.

On the other hand, if at decision block 708 it is determined that an event has been detected, an optimal line of transmission between the event location and the base station is generated and communicated to the UAV, and the process proceeds to decision block 716 to again determine whether the UAV is too close in proximity to any other of the UAVs. Assuming first a case where the UAV is not too close to another UAV, the process proceeds to block 718 where an attraction level of the UAV to each point on the line of optimal transmission, based on the distance between the respective positions, is calculated and the highest attraction point based on this calculation is determined. Here, the determined turn angle as indicated in block 720 for the case that the UAV is not dangerously close to another UAV, and an event has been detected, is based on the point of highest attraction for the UAV in comparison to its current position. The process then continues back to block 706 for new position calculation (and continued monitoring that the event condition still exists in decision block 708).

Figure 9:
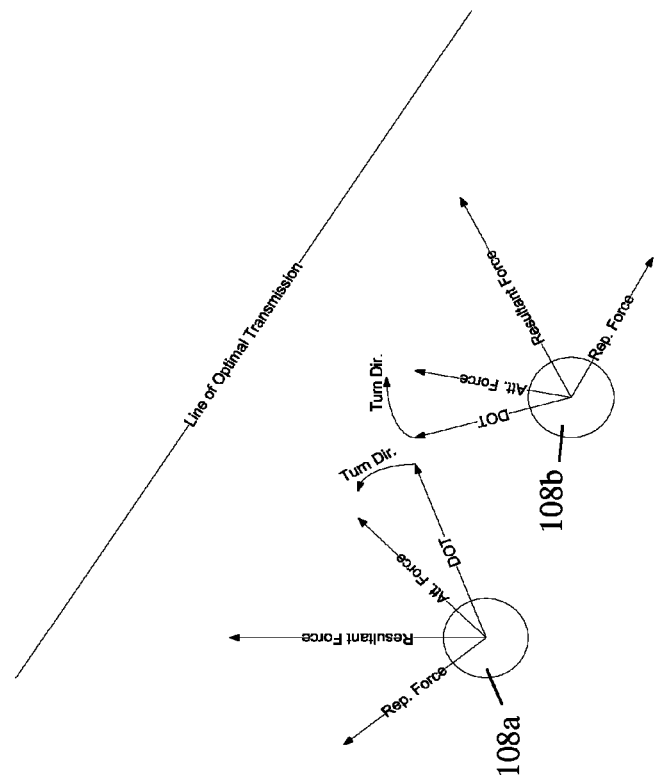
FIG. 9 schematically depicts the summation of attraction forces (to the line of optimal transmission) and repulsion forces for a pair of UAVs so as to determine a resultant force and turn direction for each.

In the case that, for event detection, the UAV is too close to one or more other UAVs in decision block 718, the process proceeds to block 722. As is the case where the UAV is not too close to other UAVs, the highest attraction point on the line of optimal transmission is still determined as shown in block 722. However, in addition to calculating an attraction force as shown in block 724, the process additionally proceeds to block 726 to calculate a total repulsion force from the repulsion forces on the UAV, thereby determining a resultant force and angle on the UAV in block 728. After comparison with the current direction of travel of the UAV, a decision about which direction to turn is made, as indicated in block 730. This allows the UAVs to keep their separation, yet continue to move closer to the line of optimal transmission. The process continues back to block 706 for new position calculation and further determination of event detection and proximity detection to other UAVs. By way of further illustration, FIG. 9 schematically depicts the summation of attraction forces (to the line of optimal transmission) and repulsion forces for a pair of UAVs 108a, 108b, so as to determine a resultant force and turn direction for each.

As a UAV nears its point of interest along the line of optimal transmission, its speed may be scaled down as to allow the UAV to come to a near stop when reaching its destination. For practical purposes, the ability of an aerial vehicle to do so would be based on the type of UAV, and thus the actual movement of the UAV may vary depending on the type vehicle in use (e.g., circling pattern, hovering pattern, etc.). When a UAV is near its point of interest, and feels the effects of a repulsion force from another UAV, its speed may be increased based on the strength of the repulsion force and its distance from its point of interest. This allows the UAVs to negotiate position along the line of optimal transmission without colliding or forcing one another to move too far away from the line. Since the line has been divided into discrete points, the idea is that a UAV may be bumped from one point to another, i.e., moving down the line, to allow another UAV to take its place on the line. Likewise, if a UAV is too entrenched in its position based on its distance from the point of interest and the total repulsion forces acting on it, the UAV applying the repulsion force could make its way further down the line until finding on open spot to fill.

Figure 10:
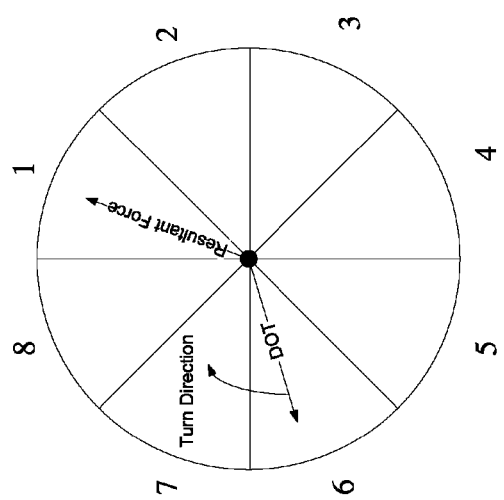
FIG. 10 is an octant diagram depicting the determination of a turn direction of a UAV based on a comparison between the octant of the direction of travel with the resultant force octant.

One initial challenge in generating a repulsion method is creating a generic anti-collision response for every situation when two or more UAVs are in close proximity, and in particular, to determine which direction the UAV should turn. For example, in order to prevent UAVs from turning in opposite directions when traveling towards one other and potentially colliding, the potential 360° of turn angle for each UAV may be divided into eight octants. In so doing, where two or more UAVs enter into close proximity of one another, the direction of travel octant may be compared to the octant that contained the resultant force on the UAV in question. This resultant force indicates the direction that the UAV desires to travel as a result of the forces being applied onto it. By comparing the direction of travel octant to the resultant force octant, a determination can be made as to which direction to turn to avoid collision with another UAV in close proximity. By way of illustration, FIG. 10 is an octant diagram depicting the determination of a turn direction based on a comparison between the octant of the direction of travel (octant 6) with the resultant force octant (octant 1). This method can also be used to determine the turn direction when both attraction and repulsion forces act on a UAV.

Another technical issue that may be considered is to determine how the attraction and repulsion forces are to be calculated, and their relationship with respect to one another. In a case where both of these forces act on a UAV positioned closely to the line of optimal transmission, the desired outcome is for the UAV to move closer to its point of interest—but if another UAV is in the way, to do so without causing a collision. This suggests that the repulsion factor be made stronger than the attraction factor when calculating the total force on an individual UAV. However, if the repulsion factor is too much larger than the attraction factor, then the UAV could possibly never reach the line of optimal transmission due to the repulsion by other UAVs. Thus, in one exemplary embodiment, favorable results may be achieved by setting the repulsion factor to about 1.5 times the attraction factor.

Figure 11:
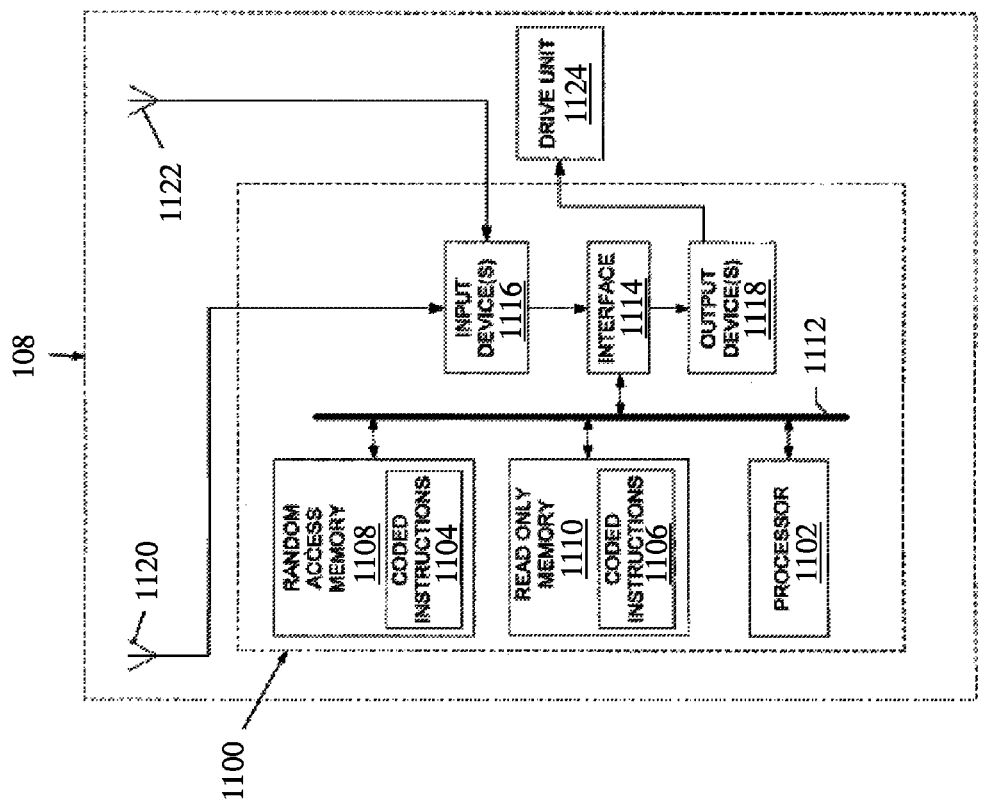
FIG. 11 is a schematic block diagram of an exemplary computer processing platform that may be used by a UAV in implementing the architecture and method embodiments of FIGS. 1-10.

Finally, FIG. 11 is a schematic block diagram of an exemplary computer processing platform 1100 that may be used by a UAV 108 in implementing the architecture and method embodiments of FIGS. 1-10. For example, the processing platform 1100 may be implemented by one or more general-purpose processors, processor cores, microcontrollers, etc. In the example depicted, the processing platform 1100 includes at least one general-purpose programmable processor 1102 that executes coded instructions 1104 and/or 1106 present in main memory of the processor 1102 (e.g., within a RAM 1108 and/or a ROM 1110). The processor 1102 may be any type of processing unit, such as a processor core, a processor and/or a microcontroller. The processor P105 may execute, among other aspects, the example process of FIG. 7 to implement the example methods and architecture described herein.

As further illustrated in FIG. 11, the processor 1102 is in communication with the main memory (including the ROM 1110 and/or the RAM 1108) via a bus 1112. The RAM 1108 may be implemented by dynamic random-access memory (DRAM), synchronous dynamic random-access memory (SDRAM), and/or any other type of RAM device, and the ROM 1110 may be implemented by flash memory and/or any other desired type of memory device. Access to the RAM 1108 and the ROM 1110 may be controlled by a memory controller (not shown). The memory devices 1108, 1110 may be used to, for example, implement the example methods described herein.

The processing platform 1100 also includes an interface circuit 1114, which may be implemented by any type of interface standard, such as an external memory interface, serial port, general-purpose input/output, etc. One or more input devices 1116 and one or more output devices 1118 are connected to the interface circuit 1114. The example input device(s) 1116 may include, for example, a pair of spaced apart directional antennas 1120, 1122 having directional sensitivity. The example output device(s) 1148 may include, for example, a drive unit 1124.

Although an exemplary manner of implementing the UAV 108 has been illustrated in FIG. 11, will be appreciated that one or more of the data structures, elements, processes and/or devices illustrated in FIG. 11 may be combined, divided, re-arranged, omitted, eliminated and/or implemented in any way. Further, the example UAV 108 may be implemented by hardware, software, firmware and/or any combination of hardware, software and/or firmware. Further still, the example UAV 108 may include data structures, elements, processes and/or devices instead of, or in addition to, those illustrated in FIG. 11 and/or may include more than one of any or all of the illustrated data structures, elements, processes and/or devices.

As will thus be appreciated, the above described embodiments provide for autonomous coordination of agents using an attraction and repulsion method, and to allow for the formation of agents into a line for extension of communication upon detection of a significant event within a network such as a Wireless Sensor and Actor Network (WSAN). In so doing, the embodiments eliminate a need for human interaction (controller) or a "communication of intentions" between agents (eliminating the need to make each agent aware of the heading of other agents).

The exemplary attraction and repulsion method sets attraction levels on points of interest and a repulsion factor between the agents. In essence, agents are attracted to points of interest based on their distance from the point (being most attracted to the closest point of interest) and also repulsed from each other (such that the repulsion is stronger the closer the agents are to each other). As the agents are attracted to the points of interest, their repulsion between each other will create a uniform distribution based on a minimum separation needed between agents, and the alignment of the points of interest. The attraction forces and repulsion forces are calculated and summed to provide a turning vector to allow the agents to avoid collision, yet maintain a heading towards their points of interest.

A technical benefit of this technique is the elimination of a need for added intelligence, such as "communication of intent," as simple attraction and repulsion forces are calculated and used to guide the agents towards points of interest and negotiate collision avoidance. This in turn allows for extension of communication from an event site to base station or data sink via a line formation of the agents.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method of controlling movement of an agent operating within an autonomous system, the method comprising:

determining, using a processing device associated with the agent, a highest attraction point for the agent on a line of optimal transmission between a detected event within an area of surveillance by the autonomous system and a base station within the autonomous system, and calculating an attraction force for the agent, based on the line of optimal transmission and location of the detected event;

determining, using the processing device associated with the agent, proximity of the agent to one or more additional agents operating within the autonomous system, and calculating a repulsion force for the agent so as to maintain a minimum separating distance between the agent and the one or more additional agents;

calculating, using the processing device associated with the agent, a resultant force for the agent based on the attraction force and the repulsion force; and changing a direction of the agent based on the resultant force.

2. The method of claim 1, wherein the resultant force is based only on the repulsion force in the absence of the detected event.

3. The method of claim 1, wherein the resultant force is based only on the attraction force in the absence of the agent being in proximity to any of the one or more additional agents.

4. The method of claim 1, wherein the changing a direction of the agent based on the resultant force comprises determining a turn angle for the agent.

5. The method of claim 4, wherein determining a turn angle for the agent further comprises dividing a 360° range of turn for the agent into octants, comparing an octant of direction of travel for the agent to an octant of the calculated resultant force for the agent, and selecting a turn direction for the agent.

6. The method of claim 1, wherein the autonomous system comprises a wireless sensor and actor network (WSAN) architecture.

7. The method of claim 6, wherein the agent comprises an unmanned aerial vehicle (UAV).

8. A method of controlling movement of agents operating within an autonomous system, the method comprising:
   determining for each agent, using a processing device associated with the agent, a highest attraction point for the agent on a line of optimal transmission between a detected event within an area of surveillance by the autonomous system and a base station within the autonomous system, and calculating an attraction force for the agent, based on the line of optimal transmission and location of the detected event;
   determining using the processing device associated with the agent, proximity of the agent to one or more additional agents operating within the autonomous system, and calculating a repulsion force for the agent so as to maintain a minimum separating distance between the agent and the one or more additional agents;
   calculating, using the processing device associated with the agent, a resultant force for the agent based on the attraction force and the repulsion force; and
   changing a direction of the agent based on the resultant force;
   wherein, upon detection of the event, the agents are disposed along the line of optimal transmission so as to define a multi-hop communication path between the event and the base station.

9. The method of claim 8, wherein the resultant force is based only on the repulsion force in the absence of the detected event.

10. The method of claim 8, wherein the resultant force is based only on the attraction force in the absence of the agent being in proximity to any of the one or more additional agents.

11. The method of claim 8, wherein the changing a direction of the agent based on the resultant force comprises determining a turn angle for the agent.

12. The method of claim 11, wherein determining a turn angle for the agent further comprises dividing a 360° range of turn for the agent into octants, comparing an octant of direction of travel for the agent to an octant of the calculated resultant force for the agent, and selecting a turn direction for the agent.

13. The method of claim 8, wherein the autonomous system comprises a wireless sensor and actor network (WSAN) architecture, and each agent comprises an unmanned aerial vehicle (UAV).

14. The method of claim 13, wherein the event is detected using a clustering algorithm implemented by one or more of: stationary sensors located within the WSAN architecture, and the UAVs.

15. A moveable agent configured to operate within an autonomous system, the agent comprising:
   a processing platform having at least one general-purpose programmable processor, the processor configured to:
      determine a highest attraction point for the agent on a line of optimal transmission between a detected event within an area of surveillance by the autonomous system and a base station within the autonomous system, and calculate an attraction force for the agent, based on the line of optimal transmission and location of the detected event;
      determine proximity of the agent to one or more additional agents operating within the autonomous system, and calculating a repulsion force for the agent so as to maintain a minimum separating distance between the agent and the one or more additional agents;
      calculate a resultant force for the agent based on the attraction force and the repulsion force; and
      change a direction of the agent based on the resultant force.

16. The agent of claim 15, wherein the resultant force is based only on the repulsion force in the absence of the detected event.

17. The agent of claim 15, wherein the resultant force is based only on the attraction force in the absence of the agent being in proximity to any of the one or more additional agents.

18. The agent of claim 15, wherein the processor is configured to change a direction of the agent based on the resultant force by determining a turn angle for the agent.

19. The agent of claim 18, wherein the processor is configured to determine a turn angle for the agent by dividing a 360° range of turn for the agent into octants, comparing an octant of direction of travel for the agent to an octant of the calculated resultant force for the agent, and selecting a turn direction for the agent.

20. The agent of claim 15, wherein the agent comprises an unmanned aerial vehicle (UAV).

* * * * *